(12) United States Patent
Woodman et al.

(10) Patent No.: US 10,841,359 B2
(45) Date of Patent: *Nov. 17, 2020

(54) MEDIA APPLICATION BACKGROUNDING

(71) Applicant: Google LLC, Mountain View, CA (US)

(72) Inventors: Oliver John Woodman, Chippenham (GB); Matt Doucleff, Washington, DC (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,054

(22) Filed: Sep. 30, 2019

(65) Prior Publication Data

US 2020/0106825 A1 Apr. 2, 2020

Related U.S. Application Data

(63) Continuation of application No. 15/404,045, filed on Jan. 11, 2017, now Pat. No. 10,432,695, which is a
(Continued)

(51) Int. Cl.
*H04N 9/80* (2006.01)
*G11B 27/00* (2006.01)
(Continued)

(52) U.S. Cl.
CPC ............ *H04L 67/02* (2013.01); *G06F 1/3206* (2013.01); *G06F 9/449* (2018.02); *G11B 27/005* (2013.01); *G11B 27/10* (2013.01); *G11B 27/105* (2013.01); *G11B 27/34* (2013.01); *G11B 27/36* (2013.01); *H04L 65/4076* (2013.01);
(Continued)

(58) Field of Classification Search
USPC ........ 386/343, 248, 239, 241, 278, 280, 326
See application file for complete search history.

(56) References Cited

U.S. PATENT DOCUMENTS 4,450,488 A 5/1984 Golding
5,596,420 A * 1/1997 Daum .................... G09G 5/393
348/515
(Continued)

FOREIGN PATENT DOCUMENTS

CN 101222296 A 7/2008
CN 101510998 A 8/2009
(Continued)

OTHER PUBLICATIONS

Chinese Office Action for Chinese Application No. 2015800062693, dated Jun. 4, 2018, 41 pages.
(Continued)

*Primary Examiner* — Daquan Zhao
(74) *Attorney, Agent, or Firm* — Lowenstein Sandler LLP

(57) ABSTRACT

A media application is disclosed. The media application provides a playback of a media item that includes a video portion and an audio portion. The media application stops the playback of the video portion of the media item while continuing to provide the audio portion of the media item. The media application resumes the playback of the video portion of the media item in synchronization with the audio portion being provided.

20 Claims, 4 Drawing Sheets

Related U.S. Application Data continuation of application No. 14/228,199, filed on Mar. 27, 2014, now Pat. No. 9,558,787.

(60) Provisional application No. 61/933,296, filed on Jan. 29, 2014.

(51) Int. Cl.

| | | |
|---|---|---|
| *H04L 29/08* | (2006.01) | |
| *G11B 27/10* | (2006.01) | |
| *G11B 27/34* | (2006.01) | |
| *G06F 9/448* | (2018.01) | |
| *G06F 1/3206* | (2019.01) | |
| *G11B 27/36* | (2006.01) | |
| *H04L 29/06* | (2006.01) | |
| H04N 5/93 | (2006.01) | |
| H04N 5/92 | (2006.01) | |
| H04N 5/76 | (2006.01) | |
| H04M 1/725 | (2006.01) | |
| H04N 21/4788 | (2011.01) | |

(52) U.S. Cl.
CPC ............ *H04L 65/607* (2013.01); *H04L 67/10* (2013.01); *H04L 67/42* (2013.01); *H04M 1/72544* (2013.01); *H04N 5/76* (2013.01); *H04N 21/4788* (2013.01)

(56) References Cited

U.S. PATENT DOCUMENTS

| | | | |
|---|---|---|---|
| 5,818,547 | A | 10/1998 | Ozaki |
| 2003/0053382 | A1 | 3/2003 | Tsujimoto |
| 2003/0228131 | A1* | 12/2003 | Miyazawa ......... H04N 21/8456 386/343 |
| 2004/0252984 | A1 | 12/2004 | Takahashi |
| 2008/0231686 | A1 | 9/2008 | Redlich |
| 2009/0271831 | A1 | 10/2009 | Binno et al. |
| 2010/0080532 | A1 | 4/2010 | Ubillos et al. |
| 2011/0299586 | A1 | 12/2011 | Odlund et al. |
| 2012/0209413 | A1 | 8/2012 | Xu et al. |
| 2013/0066526 | A1 | 3/2013 | Mondragon et al. |
| 2013/0080930 | A1 | 3/2013 | Johansson |
| 2013/0279877 | A1 | 10/2013 | Boak |
| 2013/0290993 | A1 | 10/2013 | Cheung et al. |
| 2014/0082666 | A1 | 3/2014 | Bloch et al. |
| 2014/0259046 | A1 | 9/2014 | Ren et al. |
| 2014/0338001 | A1 | 11/2014 | Zhang et al. |
| 2015/0095758 | A1 | 4/2015 | Rossi et al. |

FOREIGN PATENT DOCUMENTS

| | | |
|---|---|---|
| CN | 101753924 A | 6/2010 |
| CN | 101753946 A | 6/2010 |
| CN | 101984648 A | 3/2011 |
| CN | 102045595 A | 5/2011 |
| CN | 102123303 A | 7/2011 |
| CN | 102163073 A | 8/2011 |
| CN | 102232298 A | 11/2011 |
| CN | 102930881 A | 2/2013 |
| EP | 2627097 A2 | 8/2013 |
| JP | 2005210636 A | 8/2005 |
| JP | 2009016907 A | 1/2009 |
| JP | 2011044976 A | 3/2011 |
| JP | 2011250476 A | 12/2011 |
| JP | 2013093691 A | 5/2013 |
| KR | 20050014554 A | 2/2005 |
| KR | 2012013440 | 8/2011 |
| KR | 20110092713 A | 8/2011 |
| TW | 201334518 A | 8/2013 |
| WO | 2002019130 | 3/2002 |
| WO | 2004042723 A1 | 5/2004 |

OTHER PUBLICATIONS

Extended European Search Report dated Sep. 4, 2017 issued by the European Patent Office in European Application No. EP 15 74 3253.
PCT International Preliminary Report on Patentability for PCT/US2015/013537, 7 pages, dated Aug. 2, 2016.
International Search Report and Written Opinion for PCT/US2015/013537 dated Apr. 28, 2015.

* cited by examiner

MEDIA APPLICATION BACKGROUNDING

CROSS-REFERENCE TO RELATED APPLICATIONS

This application is a continuation of U.S. patent application Ser. No. 15/404,045, filed Jan. 11, 2017, which is a continuation of U.S. patent application Ser. No. 14/228,199, filed Mar. 27, 2014, now U.S. Pat. No. 9,558,787, which claims the benefit of U.S. Provisional Patent Application No. 61/933,296, filed Jan. 29, 2014, the entirety of which are incorporated herein by reference.

TECHNICAL FIELD

Implementations of the present disclosure relate to content delivery, and more specifically, to media playback on a device.

BACKGROUND

The Internet allows people to obtain information, connect with others and share information with each other. Common Internet destinations include news websites, content sharing platforms, social networking websites, and the like. Many websites and platforms include a content sharing aspect that allows users to view, upload, and share media items, such as video content, image content, audio content, and so on. Users can consume the media items from their user devices.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one aspect, a method includes providing, by an application executed by a processing device, a playback of a media item that includes a video portion and an audio portion. The method further includes receiving, by the application, a first message during the playback of the media item. The method further includes in response to the first message, stopping the playback of the video portion of the media item while continuing to provide the audio portion of the media item. The method further includes receiving, by the application, a second message while providing the audio portion of the media item. The method further includes in response to the second message, resuming the playback of the video portion of the media item in synchronization with the audio portion being provided.

Implementations can include any, all, or none of the following features. The method can include providing the playback of the media item, receiving a request to playback the media item, and reserving one or more resources associated with the playback of the media item in response to the request. The method can further include stopping the playback of the video portion of the media item and releasing at least one of the one or more resources. The one or more resources can include at least one of: a memory, a video decoder, or a video player. Releasing at least one of the one or more resources can include at least one of: clearing video data from a buffer, stopping a download of the video portion, or closing a network connection used for requesting the video portion. Resuming the presentation of the video portion of the media item can include reacquiring the released one or more resources. The first message can be at least one of: an indication that the application can have entered a background state on a mobile device, an indication that a display of the mobile device can be powered off, or an indication that a second application can have entered a foreground state on the mobile device. The second message can be an indication that the application can have entered a foreground state on the mobile device. The presentation of the video portion of the media item can be resumed without interrupting the presentation of the audio portion. The video portion can be initially presented at a first quality and wherein resuming the presentation of the video portion of the media item can include presenting the video portion at a second quality. The method can include presenting, via a graphical user interface, a message that the presentation of the video portion is to resume. The method can include receiving the video portion and the audio portion from different sources. The method can include receiving the video portion and the audio portion of the media item as a single file. The method can further include separating the video portion and the audio portion into separate files.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Figure 1:
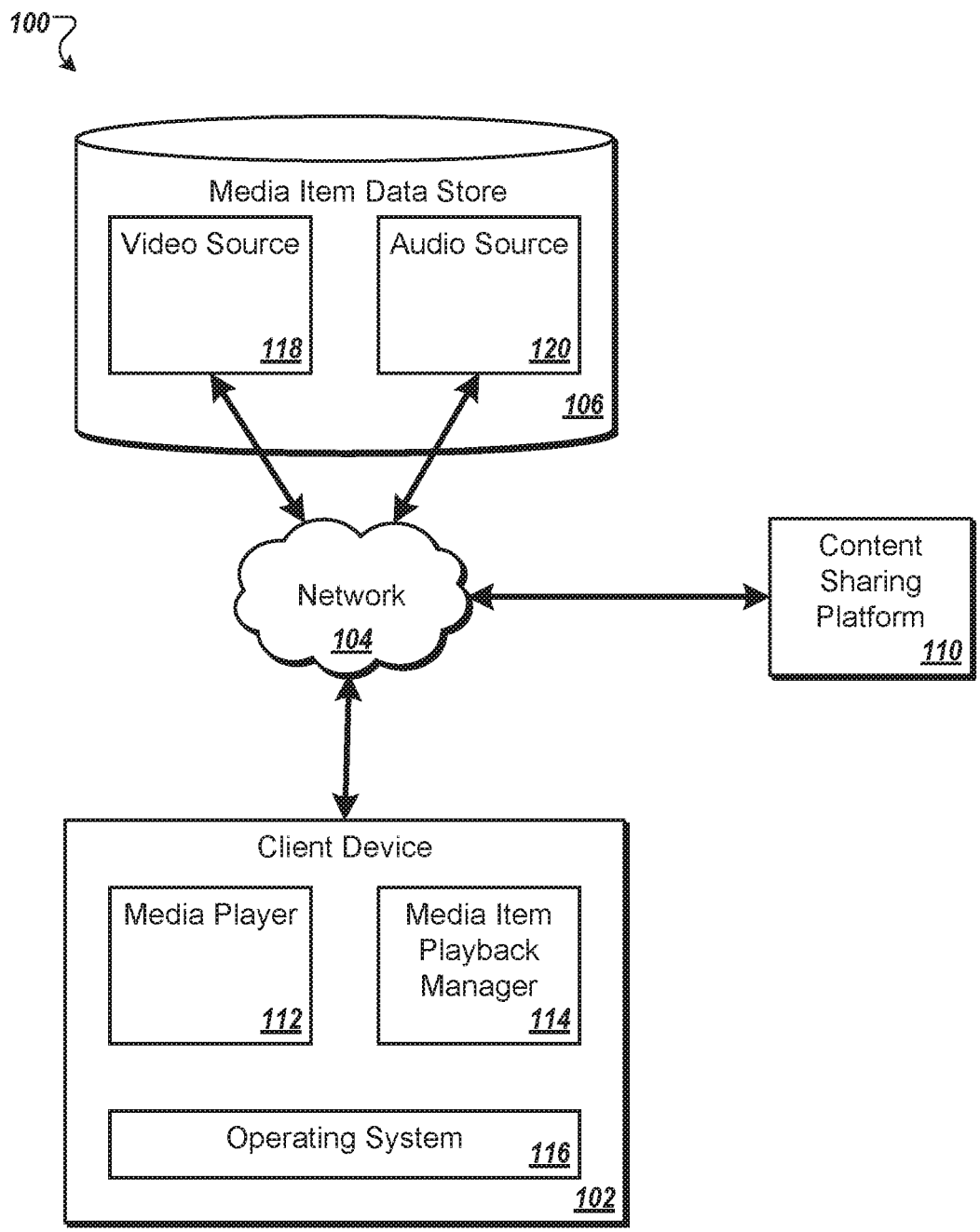
FIG. 1 illustrates an example system architecture, in accordance with one implementation of the disclosure.

Described herein is a mechanism for improving media consumption on a client device. Conventional client devices can stream media items from content sharing platforms. A media application on the client device can play the streamed media items on the client device using a media player. A user may desire to operate another feature or other application on the client device such that the audio portion of the video continues to play while the video portion is no longer displayed on the client device. For example, the user may wish to use other applications or turn the client device screen off while the audio portion continues to play. In turn, the user can minimize, close or otherwise cause the media application to enter a background state. A background state can refer to a state, in which an application continues to run while no longer being visible and an application in the background state can refer to a "backgrounded" application.

Conventional client devices typically do not permit dynamically and independently adding and/or removing video and audio streams during playback of a media item. Although a conventional client device can background a media application that is playing a video, the media application usually continues to run and process audio and video data (e.g., download, decode, cache) in spite of the video not being visible on-screen. When backgrounding a media application, conventional client devices typically also hold on to system resources, such as memory (for buffering data), network sockets and video decoders. In addition, some conventional devices can receive media items in non-multiplexed formats, where synchronized video and audio portions of a video are delivered separately. During playback, the client device generally renders the synchronized video and audio streams simultaneously. Conventional systems usually do not operate differently when the media application is backgrounded, which may cause an unnecessary consumption of resources. Mobile devices typically have a limited number of resources, which means that conventional approaches can prevent another application from using the resources.

Implementations of the present disclosure address the above deficiencies of conventional systems by providing a mechanism for controlling independent playback of a video portion of a media item and an audio portion of the media item. An application on a client device provides playback of a media item that includes a video portion and an audio portion. At any time, the application can stop playback of the video portion of the media item while continuing to provide the audio portion. Later, the application can resume playback of the video portion in synchronization with the audio portion that is being provided.

Techniques described herein can reduce the cost of operating an application in background mode. While the application is not presenting the video portion, the application can stop downloading the video portion, pause decoding any downloaded video data and clear any associated memory. By releasing these and other resources, network and battery consumption of the client device can be reduced as a result. Users often do not desire to download video they do not intend to watch, as it uses data and bandwidth. Further, the audio portion can be seamlessly provided throughout the application transitioning from foreground to background and back to foreground.

For brevity and simplicity, implementations herein are described with respect to a media item that includes an audio portion and a video portion. The media item can include any number of portions of any type. For example, portions of the media item can include audio, video, subtitle data, a stream of overlaid data, annotations, advertisements, comments, metadata, information about the content of the media item (e.g., actors, related movies, music tracks, facial recognition, and the like). Any of the portions can be handled using the techniques described herein.

FIG. 1 illustrates an example system architecture 100, in accordance with one implementation of the disclosure, for independently providing a playback of a media item that includes a video portion and an audio portion. The system architecture 100 includes any number of client devices 102, a network 104, a data store 106, and a content sharing platform 110. In one implementation, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, a distributed database, a distributed storage, or another type of component or device capable of storing data. The data store 106 may also include multiple storage components (e.g., multiple drives or multiple databases) that may also span multiple computing devices (e.g., multiple server computers). The data store 106 can store media items and portions of media items, such as audio portions and video portions. The data store 106 can include a video source 118 of a video portion of a media item. Similarly, the data store 106 can include an audio source 120 of an audio portion of a media item. In implementations, the video source 118 and the audio source 120 are stored on the same data store 106. In another implementation, the video source 118 and the audio source 120 are stored on different data stores. In implementations, the different data stores can be owned and/or operated by one entity. Alternatively, or the different data stores can be owned and/or operated by multiple separate entities For example, the video source 118 is owned and operated by a first entity and the audio source 120 is owned and operated by a second entity. The client device 102 can receive the separate video and audio streams from these two different entities.

The client devices 102 may each include computing devices such as personal computers (PCs), laptops, mobile phones, smart phones, tablet computers, netbook computers etc. In some implementations, client device 102 may also be referred to as a "user device." Each client device includes a media player 112. In one implementation, the media player 112 may be an application or part of an application that allows users to view content, such as images, videos, web pages, documents, etc. For example, the media player 112 may be a web browser that can access, retrieve, present, and/or navigate content (e.g., web pages such as Hyper Text Markup Language (HTML) pages, digital media items, etc.) served by a web server. The media player 112 may render, display, and/or present the content (e.g., a web page, a media viewer) to a user, such as via a graphical user interface (GUI). The media player 112 may also display an embedded media player (e.g., a Flash® player or an HTML5 player) that is embedded in a web page (e.g., a web page that may provide information about a product sold by an online merchant). In another example, the media player 112 may be a standalone application that allows users to view digital media items (e.g., digital videos, digital images, electronic books, etc.).

The media player 112 may be provided to the client devices 102 by a server (not shown) and/or the content sharing platform 110. For example, the media player 112 may be an embedded media player that is embedded in a web page provided by the content sharing platform 110. In another example, the media player 112 may be an application that is downloaded from the server.

In one implementation, the content sharing platform 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 110 may allow a user to consumer, upload, search for, approve of ("like"), dislike, and/or comment on media items. The content sharing platform 110 may also include a website (e.g., a webpage) that may be used to provide a user with access to the media items. Content sharing platform 110 may include any type of content delivery network providing access to content and/or media items and can include a social network, a news outlet, a media aggregator, and the like. The content sharing platform 110 can use the media item data store 106 to provide a media item to the client device 102. The content sharing platform 110 causes the client device 102 to receive media items from one or more data stores, such as from media item data store 106. In implementations, the content sharing platform 110 includes the media item data store 106. In other implementations, the media item data store 106 is not part of the content sharing platform 110. The content sharing platform 110 can be communicably coupled to the media item data store 106. When handling a user request for a media item, the content sharing platform 110 can interact with the media item data store 106 to provide the requested media item to the client device 102.

The content sharing platform 110 can present or provide a list of available media items to a client device 102. Examples of a media item can include, and are not limited to, digital video, digital movies, digital photos, photo albums, digital music, website content, social media updates, video-on-demand, live-streamed media, electronic books (ebooks), electronic magazines, digital newspapers, digital audio books, electronic journals, web log (blog) entries, real simple syndication (RSS) feeds, electronic comic books, software applications, advertisements, etc. In some implementations, media item is also referred to as a content item.

A media item may be consumed via the Internet and/or via a client application, such as the media player 112 of client device 102. For brevity and simplicity, an online video (also herein referred to as a video) is used as an example of a media item throughout this document. As used herein, "media," media item," "online media item," "digital media," "digital media item," "content," and "content item" can include one or more electronic files that can be executed or loaded using software, firmware or hardware configured to present the digital media item to an entity.

In implementations, the client device 102 includes a media item playback manager 114. The media item playback manager 114 controls playback of a media item that includes two separate portions or streams. One of the portions can be an audio portion and the other can be a video portion. The client device 102 receives the video portion from the video source 118 and the audio portion from the audio source 120. The video and audio portions can be delivered in any format and using any technology or protocol, such as HTTP Live Streaming (HLS), Dynamic Adaptive Streaming over HTTP (DASH), Adobe Dynamic Streaming for Flash®, Microsoft® Smooth Streaming, Octoshape Multi-BitRate, etc. The media item playback manager 114 coordinates synchronized playback of the video and audio portions of the media item in the media player 112 and can reserve resources, as described herein.

The media item playback manager 114 can receive an indication to alter playback of the media item. The indication can be, for example, a message (such as a preference or command) from an operating system 116. Alternatively, the media item playback manager 114 can receive the indication from any component of the client device 102 or from a user. The indication can be at least one of: an indication that the media player 112 is no longer a primary application, an indication that the media player 112 has entered a background state on the client device 102, an indication that a display of the client device 102 is powered off, an indication that a second application has entered a foreground state on the client device 102, that video associated with the media player 112 has a lower priority, or a request received from a user via an interface or button to background the media player 112. The indication may be provided by the operating system 116 to the media item playback manager 114 to stop playback of the video portion of the media player. In response to the indication, the media item playback manager 114 can stop the playback of the video portion of the media item within the media player 112 while continuing to provide the audio portion of the media item.

In implementations, the operating system 116 can track when an application presenting a media item (e.g., the media player 112) enters the foreground state and when it enters the background state. The media item playback manager 114 can receive a signal, indication or message from the operating system 116 when the application (media player 112) has entered the background state.

Upon receiving the signal, the media item playback manager 114 can release any resources associated with downloading and playing a video. The media item playback manager 114 can start a process to clear a video buffer and release video memory, a video decoder, close a network socket, and the like. In some implementations, the media item playback manager 114 can hold some resources for some period of time. Holding resources can be beneficial for performance reasons, such as when an application enters a background state and then quickly enters a foreground state. In another example, the media item playback manager 114 can release a video decoder, but continue to download data such that when the application enters the foreground state, the media player can begin decoding the video portion for a quick resume. In some implementations, the media item playback manager 114 can hold some resources and then release them after a period of time.

Subsequently, the media item playback manager 114 can receive a second indication to alter playback of the media item while the media player 112 is providing the audio portion of the media item. The second indication can be to initiate or resume playback of the video portion during playback of the audio portion (e.g., when the media player 112 enters a foreground state). The second indication can be, for example, a message (such as a preference or command) from an operating system 116 that the media player 112 is now a primary application, an indication that the media player 112 has entered a foreground state on the client device 102, an indication that a display of the client device 102 is powered on, or that video associated with the media player 112 has a high display priority. In response to the second indication, the media item playback manager 114 can instruct the media player 112 to resume the playback of the video portion of the media item in synchronization with the audio portion that is being provided.

In implementations, the content sharing platform 110 provides an index of the audio portion and the video portion that informs the client device 102 how to synchronize the audio and video portions during playback. For example, the audio and video portions can be time-indexed. When the media player 112 begins playing the media item from the beginning, the media player 112 plays back the audio and video portions from time=0, as indicated by the index. When resuming the video portion, the media item playback manager 114 can identify where in time the playing audio falls in relation to the index. The media item playback manager 114 can then instruct the media player 112 to resume the video portion at a corresponding place in time. Also, when resuming the video portion, the media item playback manager 114 can reacquire any released resources (e.g., video decoder, buffer (reallocate memory), open network sockets to download the video portion, etc.). While this is happening, the media player 112 continues to play the audio. Once the video portion is available and ready for playback, the media item playback manager 114 can again identify where in time the playing audio falls in relation to the index. By knowing the position of the audio, the media item playback manager 114 can instruct the media player 112 to resume playback of the video portion in synchronization with the playing audio portion.

In general, functions described in one implementation as being performed by the client device 102 can also be performed on the content sharing platform 110 in other implementations if appropriate. Similarly, functions described in one implementation as being performed by the content sharing platform 110 can also be performed on the client devices 102 in other implementations if appropriate. In addition, the functionality attributed to a particular component can be performed by different or multiple components operating together. For example, the media player 112 and the media item playback manager 114 can operate within a single application. The content sharing platform 110 can also be accessed as a service provided to other systems or devices through appropriate application programming interfaces (APIs), and thus is not limited to use in websites.

In some implementations, the media player 112 and the media item playback manager 114 are part of the same application. In an implementation, the media item playback manager 114 is part of the operating system 116.

In further implementations, the media item playback manager 114 can download a lower quality video when in a background state for fast resume and minimal network usage. The media item playback manager 114 can request higher quality video which the media player 112 can play when received. In some implementations, when resuming the video portion download, the media item playback manager 114 can decrease the quality of the audio portion to give more bandwidth to resume the video.

In implementations, the media item playback manager 114 can identify current network conditions. When the media item playback manager 114 determines that it cannot reliably receive the video portion, such as due to the current network conditions, the media item playback manager 114 can trigger an audio-only mode until the video portion can be reliably received. The media item playback manager 114 can prompt a user via a GUI of the low video reliability. The user can elect to proceed with audio only and the media item playback manager 114 can receive such input via the GUI and can proceed accordingly.

In some implementations, the audio portion and the video portion are delivered via a single connection, stream or file. The media item playback manager 114 or the operating system 116 can inform the content platform 110 when the media player 112 enters the background state or to send the audio portion and not the video portion. The content platform 110 can stop the delivery of the video portion via the single connection. In some implementations, when the audio portion and the video portion are delivered as a single combined file, the file can include identifiers of the video and audio portions that the media item playback manager 114 can use to separate the two portions at the client.

In implementations, the media item can be associated with a live stream or live event (e.g., an online lecture or presentation, a video game stream). For live streams and events, the media item can be packaged in segments, such as by time (e.g., five second packets) or by size (e.g., one megabyte packets). Audio packets can have a different size than the video packets. For example, the audio packets can be five seconds in length and the video packets can be ten seconds. The audio and video portions of the media item can correspond to each other but can be packaged separately. For example, a media item can be divided into 200 sequenced packets. The audio and video portions can likewise be divided into sequenced 200 packets, with each packet corresponding to the same moment in time (e.g., the $27^{th}$ packet of the video and audio portions correspond to the same moment in time). When stopping the video portion, the media item playback manager 114 can instruct the media player 112 to not play the next sequenced packet. When resuming the video portion, the media item playback manager 114 can identify which audio packet is currently playing and can instruct the media player 112 to start playing the next video packet at the same time it starts to play the next audio packet. In implementations, the media item playback manager 114 can also request and/or the next video packet from the content sharing platform 110.

In other implementations, a software developer or an end user can configure the media item playback manager 114. For example, a GUI can be provided to allow an end user to view some or all of the functionality of the media item playback manager 114 and modify it as needed. In another example, the content sharing platform 110 can provide an API to allow a software developer to configure the media item playback manager 114.

In some implementations, information, such as metadata, that corresponds to the media item currently playing back in the media player 112 in the background may be shown in a media item information portion of a user interface of the client device 102. For example, information about a video, such as its title, view count, likes, etc. can be presented. Additional menu options related to the media item currently playing in the background may also be presented, such as play, pause, stop, fast forward, rewind, social post, add comment, etc. In another implementation, the information that corresponds to the media item may be presented in a semi-transparent format (e.g., as a semi-transparent overlay or layer) while the user is performing other activities on the client device 102.

Figure 2:
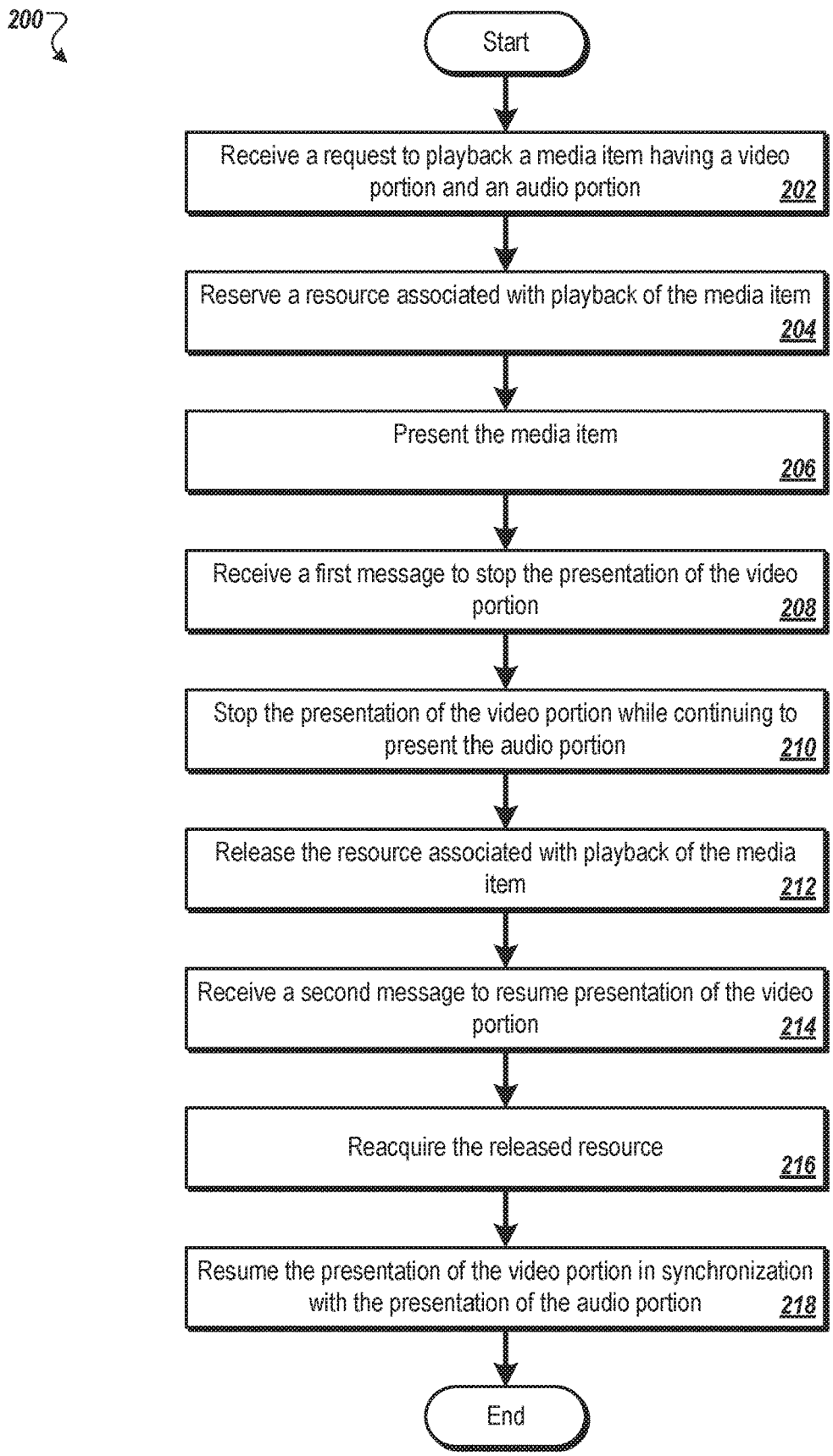
FIG. 2 is a flow diagram illustrating a method for providing efficient media application backgrounding on a client device, according to some implementations of the disclosure.

FIG. 2 is a flow diagram illustrating a method 200 for providing efficient media application backgrounding on a client device, according to some implementations of the disclosure. The method 200 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by an application, such as the media player 112 or the media item playback manager 114, or a combination thereof, as further described in conjunction with FIG. 1.

Referring to FIG. 2, method 200 begins at block 202 when processing logic receives a request to playback a media item having a video portion and an audio portion. The request can be received as user input, such as via a touch screen of a client device. At block 204, the processing logic reserves one or more resources associated with the playback of the media item in response to the request. The one or more resources can be, for example, a memory, a buffer, a video decoder, network socket, or a video player. The processing logic receives the media item from one or more sources.

At block 206, the processing logic presents the media item, which can include providing a playback of the media item via a display of the client device. At block 208, the processing logic receives a first message during the playback of the media item.

At block 210, in response to the first message, the processing logic stops the playback of the video portion of the media item while continuing to provide the audio portion of the media item. At block 212, the processing logic releases at least one of the one or more resources associated with the playback of the media item. For example, when releasing the at least one of the one or more resources, the processing logic can include at least one of: clearing video data from a buffer, stopping a download of the video portion, or closing a network connection used for requesting the video portion.

At block 214, the processing logic receives a second message while providing the audio portion of the media item. In implementations, the second message is an indication that an application executed by the processing logic has entered a foreground state on the client device. At block 216, the processing logic reacquires the released resource(s). At block 218 and in response to the second message, the processing logic resumes the playback of the video portion of the media item in synchronization with the audio portion being provided. In implementations, the processing logic resumes presentation of the video portion of the media item without interrupting the presentation of the audio portion.

In implementations, the processing logic presents the video portion initially at a first quality level or bitrate and when resuming the presentation of the video portion of the media item, the processing logic presents the video portion at a second quality level or bitrate. For example, the second quality can be higher than the first quality due to improved network resources.

Figure 3:
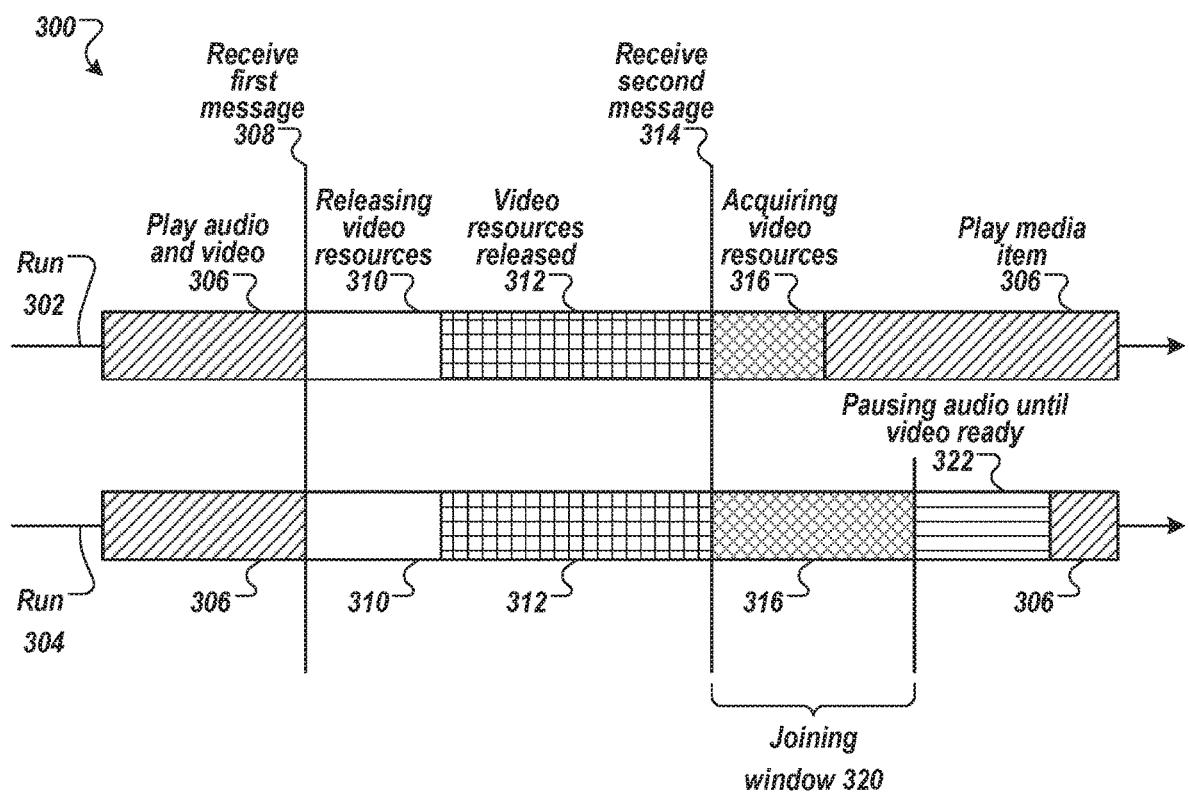
FIG. 3 illustrates two example timelines for providing efficient media application backgrounding on a client device, according to some implementations of the disclosure.

FIG. 3 illustrates two example timelines 302, 304 for providing efficient media application backgrounding on a client device, according to some implementations of the disclosure. Intervals and events are used to illustrate activities. Length or dimensions of the intervals are not indicative of a particular time or duration, nor are they indicative of any time or duration relative to each other. Any interval can be any amount or duration of time.

In a first example, run 302, an application on a client device, such as the client device 102 illustrated in conjunction with FIG. 1, plays both an audio portion and a video portion of a media item during interval 306. At event 308, the application receives a first message and, in response to the message, stops playback of the video portion while continuing to playback the audio portion, as described herein. During interval 310, the application releases video resources and by the end of interval 312, the video resources are released. At event 314, the application receives a second message. In response to the second message received at event 314, the application acquires video resources during interval 316. Once the video resources are acquired, the application can resume playback of the video portion of the media item while continuing to playback the audio portion during interval 306.

In a second example, run 304, the application functions similarly to the first example, run 302. The second example further includes a joining window 320 which is an allowable duration for the application to acquire video resources and to begin playing the video portion in synchronization with the audio portion. The duration of the joining window 320 can be a predetermined amount of time (e.g., five seconds). Alternatively, the duration of the joining window 320 can be dynamic and can depend on any variable pertaining to the media item. For example, a duration of the joining window 320 can be a remaining duration of an audio data packet that is currently being played. During the joining window 320, the client device can render a prompt to indicate to a user that the video is loading, buffering, etc. For example, the prompt can include a thumbnail, a spinner, a message, and the like. The prompt can be displayed until the video portion resumes. In implementations, the client device can resume the video portion at a lower quality or bitrate for fast resume and can dynamically adjust the video quality or bitrate. If the video portion is not played or resumed within the joining window 320, then the application can pause the audio (e.g., for duration of interval 322) until the video portion is ready for playback.

Figure 4:
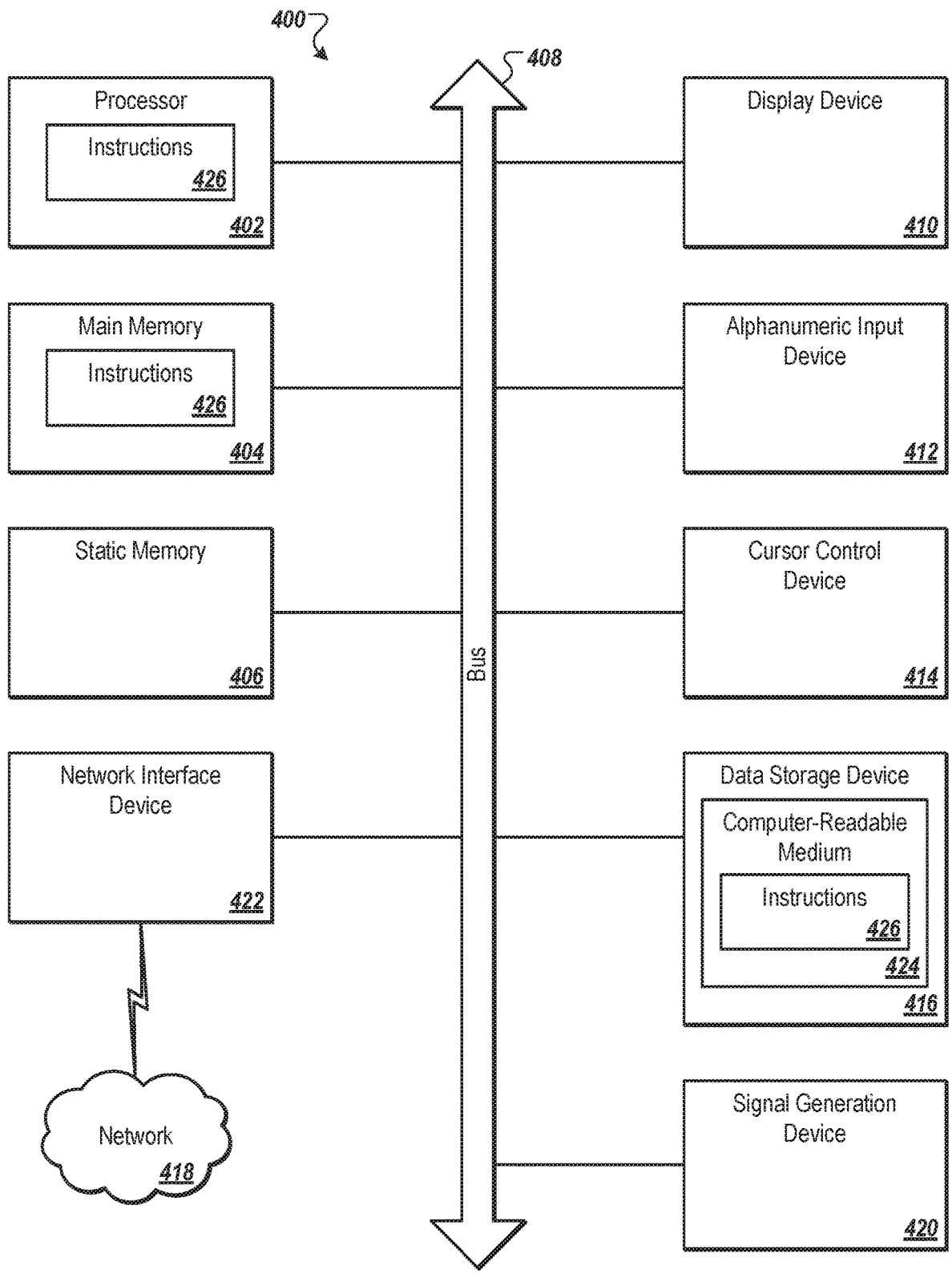
FIG. 4 is a block diagram illustrating an exemplary computer system, according to some implementations.

FIG. 4 illustrates a diagrammatic representation of a machine in the example form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets.

The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored one or more sets of instructions 426 (e.g., software) embodying any one or more of the methodologies or functions described herein. The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 418 via the network interface device 422.

In one implementation, the instructions 426 include instructions for a media player or a media item playback manager, which may correspond, respectively, to the media player 112 or the media item playback manager 114 described with respect to FIG. 1, and/or a software library containing methods that provide a media player or a media item playback manager. While the computer-readable storage medium 424 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   providing, by a first application executed by a processing device in a computing device, a playback of a media item received from a content platform, wherein the media item comprises a video portion and an audio portion, and wherein the playback of the video portion occurs on a display device of the computing device;
   in response to the first application entering a background state during the playback of the media item, stopping the playback of the video portion on the display device while continuing to provide the playback of the audio portion while the first application is in the background state, the first application entering the background state responsive to a second application becoming a primary application on the computing device or a display device of the computing device being turned off; and
   in response to the first application entering a foreground state during the playback of the audio portion without the playback of the video portion, resuming the playback of the video portion, wherein resuming comprises coordinating synchronization of the playback of the video portion with the playback of the audio portion that continued to be provided while the first application was in the background state.

2. The method of claim 1, wherein providing the playback of the media item comprises:
   receiving a request to start the playback of the media item; and
   reserving one or more resources associated with the playback of the media item in response to receiving the request to start the playback, wherein stopping the playback of the video portion comprises releasing at least one resource from the resources, and wherein the resource is associated with the playback of the video portion.

3. The method of claim 2, wherein the resource comprises at least one of:
   a memory, a buffer, a video decoder, or a video player.

4. The method of claim 2, wherein releasing the resource comprises performing at least one of: clearing video data from a buffer or closing a network connection used for requesting the video portion.

5. The method of claim 2, wherein resuming the playback of the video portion comprises reacquiring the released resource.

6. The method of claim 1, wherein the playback of the video portion is resumed without interrupting the playback of the audio portion.

7. The method of claim 1, wherein the playback of the video portion is initially at a first quality and wherein resuming the playback of the video portion is at a second quality.

8. The method of claim 1 further comprising presenting, via a graphical user interface, a message that the playback of the video portion is to resume.

9. The method of claim 1 further comprising receiving the video portion and the audio portion from different sources.

10. The method of claim 1 further comprising:
    receiving the video portion and the audio portion as a single connection, stream, or file; and
    separating the video portion and the audio portion into separate files.

11. A computing device comprising:
    a display device; and
    a processing device configured to:
    provide, by a first application executed by the processing device in the computing device, a playback of a media item received from a content platform, wherein the media item comprises a video portion and an audio portion, and wherein the playback of the video portion occurs on the display device of the computing device;
    in response to the first application entering a background state during the playback of the media item, stop the playback of the video portion on the display device while continuing to provide the playback of the audio portion while the first application is in the background state, the first application entering the background state responsive to a second application becoming a primary application on the computing device or a display device of the computing device being turned off; and
    in response to the first application entering a foreground state during the playback of the audio portion without the playback of the video portion, resume the playback of the video portion, wherein, to resume the playback of the video portion, the processing device is to coordinate synchronization of the playback of the video portion with the playback of the audio portion that continued to be provided while the first application was in the background state.

12. The computing device of claim 11, wherein, to provide the playback of the media item, the processing device is to:
    receive a request to start the playback of the media item; and
    reserve one or more resources associated with the playback of the media item in response to receipt of the request to start the playback, wherein, to stop the playback of the video portion, the processing device is to release at least one resource from the resources, and wherein the resource is associated with the playback of the video portion.

13. The computing device of claim 12, wherein the resource comprises at least one of: a memory, a buffer, a video decoder, or a video player.

14. The computing device of claim 12, wherein, to release the resource, the processing device is to perform at least one of: clear video data from a buffer or close a network connection used for requesting the video portion.

15. The computing device of claim 12, wherein, to resume the playback of the video portion, the processing device is to reacquire the released resource.

16. A non-transitory machine-readable medium having instructions stored therein that, when executed by a processing device in a computing device, cause the processing device to:
    provide, by a first application executed by the processing device in the computing device, a playback of a media item received from a content platform, wherein the media item comprises a video portion and an audio portion, and wherein the playback of the video portion occurs on a display device of the computing device;
    in response to the first application entering a background state during the playback of the media item, stopping the playback of the video portion on the display device while continuing to provide the playback of the audio portion while the first application is in the background state, the first application entering the background state responsive to a second application becoming a primary application on the computing device or a display device of the computing device being turned off; and in response to the first application entering a foreground state during the playback of the audio portion without the playback of the video portion, resuming the playback of the video portion, wherein resuming comprises coordinating synchronization of the playback of the video portion with the playback of the audio portion that continued to be provided while the first application was in the background state.

17. The machine-readable medium of claim 16, wherein, to provide the playback of the media item, the processing device is to:

receive a request to start the playback of the media item; and reserve one or more resources associated with the playback of the media item in response to receipt of the request to start the playback, wherein, to stop the playback of the video portion, the processing device is to release at least one resource from the resources, and wherein the resource is associated with the playback of the video portion.

18. The machine-readable medium of claim 17, wherein the resource comprises at least one of: a memory, a buffer, a video decoder, or a video player.

19. The machine-readable medium of claim 17, wherein, to release the resource, the processing device is to perform at least one of: clear video data from a buffer or close a network connection used for requesting the video portion.

20. The machine-readable medium of claim 17, wherein, to resume the playback of the video portion, the processing device is to reacquire the released resource.

* * * * *